(No Model.)

G. C. HEMENWAY.
FISHING LEADER.

No. 469,015. Patented Feb. 16, 1892.

Attest:
C. M. Benjamin.
A. C. Aubery

George Cowks Hemenway
Inventor,
by Henry P. Wells
his Atty.

UNITED STATES PATENT OFFICE.

GEORGE C. HEMENWAY, OF NEW YORK, N. Y., ASSIGNOR OF ONE-HALF TO CHARLES F. IMBRIE, OF SAME PLACE.

FISHING-LEADER.

SPECIFICATION forming part of Letters Patent No. 469,015, dated February 16, 1892.

Application filed August 28, 1891. Serial No. 404,024. (No model.)

*To all whom it may concern:*

Be it known that I, GEORGE COWLES HEMENWAY, a citizen of the United States, and a resident of the city of New York, in the State of New York, have invented a new and useful Improvement in Fishing-Leaders, of which the following is a specification.

My invention relates to that portion of an angler's outfit known as "leaders" or "casting-lines." Heretofore such leaders have been made by knotting together a greater or less number of strands of silk-worm gut until the desired length has been obtained. As the length of these strands seldom exceeds a foot and often, particularly in the heavier sizes, falls much short of that, the number of knots in a leader of any length is considerable. This has long been conceded by all anglers to be very objectionable—first, because, as is well known, the knots are always the weakest part of the leader, and, second, since the knots are conspicuous both of themselves and because of the disturbance they create in the water when the leader is drawn through it. This latter defect is especially noticeable and detrimental in fly-fishing, wherein a leader is indispensable and when the flies are attached to the leader and first cast upon the water at a distance from the angler and then drawn toward him.

My invention is intended to meet and overcome all these difficulties and to afford a leader in which the places of juncture of the strands is the strongest instead of the weakest part, in which there are no knots, and in which the leader is sufficiently near of the same diameter from end to end as to enable it to be drawn with the minimum possible disturbance over or through the water.

Figure 1:
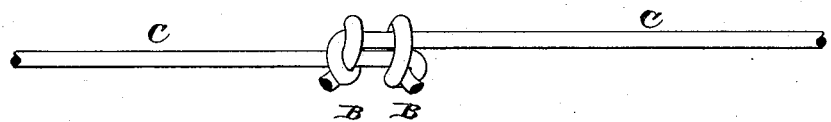
Figure 2:
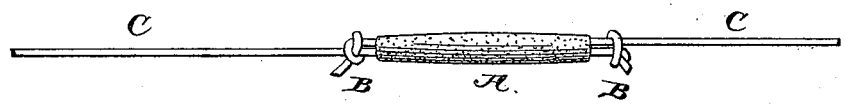
Figure 3:
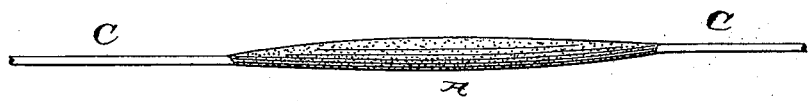

In the drawings which form part of this specification, Figure 1 represents two strands of an ordinary leader united by what is known as the "single" water-knot, which is the least conspicuous method in general use. Fig. 2 represents my method of accomplishing the same result at the end of the first stage of my process. Fig. 3 represents my leader completed.

In the drawings the diameters are in all cases much exaggerated for the sake of clearness.

To produce my leader, I first lap two strands of silk-worm gut and knot them, as shown in Fig. 2. The sole object of the knotting is to retain the strands for a time parallel with one another and in close contact. Any method of treatment which will accomplish this result will answer every purpose. I next apply a coating of a cement formed by dissolving ordinary sheet-celluloid in ether to the thickness of a sirup, being careful not to cover the knots, all substantially as shown in Fig. 2, in which A is the cement, B the knots, and C C the strands of gut to be united. When the cement is dry, which soon takes place, the knots B are cut off and a second coat of the cement is applied so as to cover the ends, with the result shown in an exaggerated manner in Fig. 3.

Thus a leader may be formed of any desired length in which the places of juncture of its various strands will be the strongest part of the leader; also, the enlargement of the places of juncture scarcely exceeds the thickness of the parts when lapped together and is of such shape as to permit the leader being drawn through or over the water with the least possible disturbance.

Of course many cements have been or may be discovered which will answer the purpose. Any cement which will be reasonably flexible when set, which will unite gut with gut with sufficient tenacity and which is not affected by water, will do. I have myself used several different cements with success; but that given answers every purpose and is best at present known to me. With this cement and an inch or a little more of lap I have found it impossible to pull the strongest gut apart at the joints even after long soaking in water.

Having thus described my invention, what I claim as new, and desire to patent, is—

As a new article of manufacture, a fishing leader composed of strands of silk-worm gut or similar material, the component parts of which are laid or lapped together and held in place by a flexible water-proof cement.

In testimony that I claim the foregoing as my invention I have signed my name, in presence of two witnesses, this 24th day of August, 1891.

G. C. HEMENWAY.

Witnesses:
  HENRY P. WELLS,
  WILLIAM KING.